United States Patent
Geng et al.

(10) Patent No.: US 11,095,514 B2
(45) Date of Patent: Aug. 17, 2021

(54) SYSTEM AND METHOD FOR PROPAGATING ANIMA NETWORK OBJECTIVE CHANGES

(71) Applicant: Huawei Technologies Co., Ltd., Shenzhen (CN)

(72) Inventors: Yongsheng Geng, Nanjing (CN); He Huang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/913,274

(22) Filed: Jun. 26, 2020

(65) Prior Publication Data

US 2020/0351153 A1     Nov. 5, 2020

Related U.S. Application Data

(63) Continuation of application No. PCT/CN2018/119269, filed on Dec. 5, 2018.

(30) Foreign Application Priority Data

Dec. 27, 2017 (CN) .......................... 201711449449.6

(51) Int. Cl.
G06F 15/177 (2006.01)
H04L 12/24 (2006.01)
H04L 29/08 (2006.01)

(52) U.S. Cl.
CPC ............ *H04L 41/082* (2013.01); *H04L 67/34* (2013.01)

(58) Field of Classification Search
CPC ....... H04L 41/082; H04L 67/34; H04L 67/10; H04L 41/0813; H04L 41/084;
(Continued)

(56) References Cited

U.S. PATENT DOCUMENTS 9,626,177 B1 *  4/2017  Madduri ................ G06F 21/57
10,972,356 B2    4/2021  Liu et al.
(Continued)

FOREIGN PATENT DOCUMENTS

| CN | 101521927 A | 9/2009 |
| CN | 107431669 B | 12/2020 |
| WO | 2017070817 A1 | 5/2017 |

OTHER PUBLICATIONS

Carpenter, B. et al., "Transferring Bulk Data over the GeneRic Autonomic Signaling Protocol (GRASP)," draft-carpenter-anima-grasp-bulk-00, Network Working Group Internet-Draft, Intended Status: Informational, Expires: Mar. 16, 2018, Sep. 12, 2017, 10 pages.

(Continued)

*Primary Examiner* — Johnny B Aguiar
(74) *Attorney, Agent, or Firm* — Slater Matsil, LLP

(57) ABSTRACT

A method including sending, by a first network device, to a second network device, a first objective locally stored in the first network device to a second network device, wherein an autonomic networking integrated model and approach (ANIMA) protocol is run on both the first network device and the second network device, determining, by the first network device, whether the first objective locally stored in the first network device is changed, and sending, by the first network device, a first objective change packet to the second network device in response to the first network device determining that the first objective locally stored in the first network device is changed, the first objective change packet instructing the second network device to change the first objective locally stored in the second network device.

17 Claims, 11 Drawing Sheets

(58) Field of Classification Search
CPC .......... H04L 41/0846; H04L 41/0806; H04L 41/0886; G06F 8/65
USPC ...................................... 709/220, 221, 222
See application file for complete search history.

(56) References Cited

U.S. PATENT DOCUMENTS

| | | | |
|---|---|---|---|
| 2007/0094362 A1* | 4/2007 | Li | H04L 65/1006 709/220 |
| 2007/0130217 A1* | 6/2007 | Linyard | G06F 16/275 |
| 2010/0100641 A1* | 4/2010 | Quinlan | H04L 67/1095 709/248 |
| 2013/0238768 A1* | 9/2013 | Vaidya | H04L 67/14 709/220 |
| 2017/0180475 A1* | 6/2017 | Micucci | H04L 67/1095 |

OTHER PUBLICATIONS

Carpenter, B. et al., "Generic Autonomic Signaling Protocol Application Program Interface (GRASP API)," draft-liu-anima-grasp-api-05, Network Working Group Internet-Draft, Intended Status: Standards Track, Expires: Apr. 5, 2018, Oct. 2, 2017, 24 pages.

Carpenter, B. et al.,"Technical Objective Formats for the Automatic Network Infrastructure draft-carepenter-anima-ani-objectives-03," Network Working Group, Internet Draft, Intended Status: Informational, Expires: Jan. 17, 2018, Huawei Technologies Co., Ltd., Jul. 16, 2017, 10 pages.

Long X. et al., "Autonomic Networking: Architecture Design and Standardization," IEEE Internet Computing, vol. 21, Issue: 5, 2017, 6 pages.

* cited by examiner

| Information type (message_type) | Session identifier (session-id) | Initiator (initiator) | TTL | Objective name (objective-name) | Objective flag (objective-flag) | Loop count (loop-count) | Objective value (objective-value) |
|---|---|---|---|---|---|---|---|

FIG. 4

| Information type (message_type) | Session identifier (session-id) | Initiator (initiator) | Objective name (objective-name) | Objective flag (objective-flag) | Loop count (loop-count) | Objective value (objective-value) |

FIG. 5

| Information type (message_type) | Session identifier (session-id) | Initiator (initiator) | Objective name (objective-name) | Objective flag (objective-flag) | Loop count (loop-count) | Objective value (objective-value) | Objective name (objective-name) | Objective flag (objective-flag) | Loop count (loop-count) | Objective value (objective-value) |
|---|---|---|---|---|---|---|---|---|---|---|

FIG. 6

SYSTEM AND METHOD FOR PROPAGATING ANIMA NETWORK OBJECTIVE CHANGES

CROSS-REFERENCE TO RELATED APPLICATIONS

This application is a continuation of International Application No. PCT/CN2018/119269, filed on Dec. 5, 2018, which claims priority to Chinese Patent Application No. 201711449449.6, filed on Dec. 27, 2017. The disclosures of the aforementioned applications are hereby incorporated by reference in their entireties.

TECHNICAL FIELD

This application relates to the field of communications technologies, and in particular, to an autonomic networking integrated model and approach (ANIMA) network information processing method, a device, and a system.

BACKGROUND

An ANIMA network is a self-organizing network. Automation of the ANIMA network mainly achieves four objectives, including self-configuration, self-protection, self-healing, and self-optimization, to minimize dependence on a network administrator or a centralized management system by using an autonomic function. An ANIMA network architecture is divided into two layers, including an autonomic service agent (ASA) layer and an autonomic network infrastructure (ANI) layer. The ANI is further divided into three phases, including a bootstrap, an autonomic control plane (ACP), and a generic autonomic signaling protocol (GRASP). The bootstrap is responsible for securely starting and bootstrapping a network device, and for performing authentication after the network device joins in an ANIMA domain and allocating a domain certificate. The ACP is responsible for establishing a hop-by-hop encrypted internet protocol (IP) tunnel between network devices, to form a stable management virtual private network (VPN) and implement interworking between multi-hop network devices in the VPN based on an interior gateway protocol (IGP). GRASP is a standard signaling protocol for interaction between ASAs, and is responsible for enabling an ASA and implementing functions such as dynamic neighbor discovery, status synchronization, and parameter setting negotiation.

A technical objective, referred to as an objective for short in this specification, is a configurable parameter or a configurable parameter set operated in GRASP discovery, synchronization, negotiation, and flooding mechanisms. In the ANIMA network, a network device that serves as an initiator sends, based on GRASP, an objective to a network device that serves as a receiver, so that the receiver performs configuration based on the received objective.

In an actual application scenario, when an objective of an initiator is changed, the objective stored in a receiver cannot be changed in time, but only wait for aging of the objective stored in the receiver, or wait for a discovery, synchronization, negotiation, or flooding mechanism that is corresponding to the objective and that is restarted by the initiator.

SUMMARY

In view of this, embodiments of this application provide an ANIMA network information processing method, a device, and a system. When a network device detects that a locally stored objective is changed, the network device automatically notifies a peer network device of the network device, of a change of the objective, so that the peer network device changes the locally stored objective in time. This helps the peer network device reduce central processing unit (CPU) and storage resource occupation.

Technical solutions provided in the embodiments of this application are as follows.

According to a first aspect, an ANIMA network information processing method is provided. The method includes sending, by a first network device, a first objective to a second network device, where an ANIMA protocol is run on both the first network device and the second network device, then, determining, by the first network device, whether the locally stored first objective is changed, and sending, by the first network device, a first objective change packet to the second network device when the first network device determines that the locally stored first objective is changed, to instruct the second network device to change the first objective that is from the first network device and that is locally stored in the second network device.

Based on the solution provided in this embodiment, in an ANIMA network scenario, when a network device detects that a locally stored objective is changed, the network device automatically notifies a peer network device of the network device, of a change of the objective, so that the peer network device changes the locally stored objective in time. This helps the peer network device reduce CPU and storage resource occupation.

In a possible implementation of the first aspect, the determining, by the first network device, whether the locally stored first objective is changed includes determining, by the first network device, whether the locally stored first objective is deleted, and the sending, by the first network device, a first objective change packet to the second network device when the first network device determines that the locally stored first objective is changed, to instruct the second network device to change the first objective that is from the first network device and that is locally stored in the second network device includes when the first network device determines that the locally stored first objective is deleted, sending, by the first network device, the first objective change packet to the second network device, to instruct the second network device to delete the first objective that is from the first network device and that is locally stored in the second network device.

In still another possible implementation of the first aspect, the determining, by the first network device, whether the locally stored first objective is changed includes determining, by the first network device, whether the locally stored first objective is modified, and the sending, by the first network device, a first objective change packet to the second network device when the first network device determines that the locally stored first objective is changed, to instruct the second network device to change the first objective that is from the first network device and that is locally stored in the second network device includes when the first network device determines that the locally stored first objective is modified, sending, by the first network device, the first objective change packet to the second network device, to instruct the second network device to modify the first objective that is from the first network device and that is locally stored in the second network device.

In yet another possible implementation of the first aspect, obtaining, by the first network device, an ANIMA disabling message, where the ANIMA disabling message is used to instruct the first network device to disable an ANIMA function of a first port, and the first port is a port through which the first network device sends the first objective to the second network device, and before the first network device disables the ANIMA function of the first port according to the ANIMA disabling message, sending, by the first network device, a second objective change packet to the second network device, to instruct the second network device to delete, according to the second objective change packet, the first objective that is from the first network device and that is locally stored in the second network device.

According to a second aspect, an ANIMA network information processing method is provided. The method includes receiving, by a second network device, a first objective sent by a first network device, where an ANIMA protocol is run on both the first network device and the second network device, storing, by the second network device, the first objective, then receiving, by the second network device, a first objective change packet sent by the first network device, where the first objective change packet is generated by the first network device in response to a change of the first objective locally stored in the first network device, and changing, by the second network device according to the first objective change packet, the first objective locally stored in the second network device.

Based on the solution provided in this embodiment, in an ANIMA network scenario, when a network device detects that a locally stored objective is changed, the network device automatically notifies a peer network device of the network device, of a change of the objective, so that the peer network device changes the locally stored objective in time. This helps the peer network device reduce CPU and storage resource occupation.

In a possible implementation of the second aspect, the changing, by the second network device according to the first objective change packet, the first objective locally stored in the second network device includes deleting, by the second network device according to the first objective change packet, the first objective stored in the second network device.

In still another possible implementation of the second aspect, the changing, by the second network device according to the first objective change packet, the first objective locally stored in the second network device includes modifying, by the second network device according to the first objective change packet, the first objective stored in the second network device.

In yet another possible implementation of the second aspect, forwarding, by the second network device, the first objective to a third network device, determining, by the second network device, whether a first communications link is faulty, where the first communications link is a communications link through which the second network device receives the first objective sent by the first network device, and when the second network device determines that the first communications link is faulty, sending, by the second network device, a second objective change packet to the third network device, to instruct the third network device to delete the first objective locally stored in the third network device.

In the first aspect or the second aspect, optionally, the first objective change packet is a GRASP message, the GRASP message includes a first identifier, and the first identifier is used to indicate that the GRASP message is an objective change packet. Further, optionally, the GRASP message further includes a second identifier, and the second identifier is used to indicate a change type of the first objective that is from the first network device and that is locally stored in the second network device.

According to a third aspect, a first network device is provided. The first network device has a function of implementing behavior of the first network device in the foregoing methods. The function may be implemented based on hardware, or may be implemented based on hardware executing corresponding software. The hardware or the software includes one or more modules corresponding to the foregoing function.

In a possible design, a structure of the first network device includes a processor and an interface. The processor is configured to support the first network device in performing a corresponding function in the foregoing method. The interface is configured to support communication between the first network device and a second network device, and send information or an instruction in the foregoing method to the second network device, or receive information or an instruction in the foregoing method from the second network device. The first network device may further include a memory. The memory is coupled to the processor, and the memory stores a program instruction and data that are necessary for the first network device.

In another possible design, the first network device includes a processor, a transmitter, a receiver, a random access memory, a read-only memory, and a bus. The processor is coupled to the transmitter, the receiver, the random access memory, and the read-only memory through the bus. When the first network device needs to run, a bootloader in a basic input/output system or an embedded system that is integrated into the read-only memory is used to boot a system to start, and boot the first network device to enter a normal running state. After the first network device enters the normal running state, an application program and an operating system are run in the random access memory, to enable the processor to perform the method in any one of the first aspect or the possible implementations of the first aspect.

According to a fourth aspect, a first network device is provided, where the first network device includes a main control board and an interface board, and may further include a switching board. The first network device is configured to perform the method in any one of the first aspect or the possible implementations of the first aspect. The first network device includes a module configured to perform the method in any one of the first aspect or the possible implementations of the first aspect.

According to a fifth aspect, a first network device is provided. The first network device includes a controller and a first forwarding sub-device. The first forwarding sub-device includes an interface board, and may further include a switching board. The first forwarding sub-device is configured to perform a function of the interface board according to the fourth aspect, and may further perform a function of the switching board according to the fourth aspect. The controller includes a receiver, a processor, a transmitter, a random access memory, a read-only memory, and a bus. The processor is coupled to the receiver, the transmitter, the random access memory, and the read-only memory through the bus. When the controller needs to run, a bootloader in a basic input/output system or an embedded system that is integrated into the read-only memory is used to boot the system to start, and boot the controller to enter a normal running state. After the controller enters the normal running state, an application program and an operating system are run in the random access memory, to enable the processor to perform the function of the main control board of the fourth aspect.

According to a sixth aspect, a computer storage medium is provided and is configured to store a program, code, or an instruction through which the foregoing first network device, and when a processor or a hardware device executes the program, the code, or the instruction, functions or steps of the first network device in the foregoing aspects may be completed.

According to a seventh aspect, a second network device is provided. The second network device has a function of implementing behavior of the second network device in the foregoing methods. The function may be implemented based on hardware, or may be implemented based on hardware executing corresponding software. The hardware or the software includes one or more modules corresponding to the foregoing function.

In a possible design, a structure of the second network device includes a processor and an interface. The processor is configured to support the second network device in performing a corresponding function in the foregoing method. The interface is configured to support communication between the second network device and a first network device, and send information or an instruction in the foregoing method to the first network device, or receive information or an instruction in the foregoing method from the first network device. The second network device may further include a memory. The memory is coupled to the processor, and the memory stores a program instruction and data that are necessary for the second network device.

In another possible design, the second network device includes a processor, a transmitter, a receiver, a random access memory, a read-only memory, and a bus. The processor is coupled to the transmitter, the receiver, the random access memory, and the read-only memory through the bus. When the second network device needs to run, a bootloader in a basic input/output system or an embedded system that is integrated into the read-only memory is used to boot a system to start, and boot the second network device to enter a normal running state. After the second network device enters the normal running state, an application program and an operating system are run in the random access memory, to enable the processor to perform the method in any one of the second aspect or the possible implementations of the second aspect.

According to an eighth aspect, a second network device is provided, where the second network device includes a main control board and an interface board, and may further include a switching board. The second network device is configured to perform the method in any one of the second aspect or the possible implementations of the second aspect. The second network device includes a module configured to perform the method in any one of the second aspect or the possible implementations of the second aspect.

According to a ninth aspect, a second network device is provided. The second network device includes a controller and a second forwarding sub-device. The second forwarding sub-device includes an interface board, and may further include a switching board. The second forwarding sub-device is configured to perform a function of the interface board according to the eighth aspect, and may further perform a function of the switching board according to the eighth aspect. The controller includes a receiver, a processor, a transmitter, a random access memory, a read-only memory, and a bus. The processor is coupled to the receiver, the transmitter, the random access memory, and the read-only memory through the bus. When the controller needs to run, a bootloader in a basic input/output system or an embedded system that is integrated into the read-only memory is used to boot the system to start, and boot the controller to enter a normal running state. After the controller enters the normal running state, an application program and an operating system are run in the random access memory, to enable the processor to perform the function of the main control board of the eighth aspect.

According to a tenth aspect, a computer storage medium is provided and is configured to store a program, code, or an instruction through which the foregoing second network device, and when a processor or a hardware device executes the program, the code, or the instruction, functions or steps of the second network device in the foregoing aspects may be completed.

According to an eleventh aspect, an ANIMA network system is provided. The ANIMA network system includes a first network device and a second network device. The first network device is the first network device in the third aspect, the fourth aspect, or the fifth aspect, the second network device is the second network device in the seventh aspect, the eighth aspect, or the ninth aspect.

According to the foregoing solutions, the embodiments of this application provide an ANIMA network information processing method, a device, and a system. In an ANIMA network scenario, when a network device detects that a locally stored objective is changed, the network device automatically notifies a peer network device of the network device, of a change of the objective, so that the peer network device changes the locally stored objective in time. This helps the peer network device reduce CPU and storage resource occupation.

BRIEF DESCRIPTION OF THE DRAWINGS

FIG. 4 is a diagram of a packet format of an objective change packet according to an embodiment of this application;

FIG. 5 is a diagram of a packet format of another objective change packet according to an embodiment of this application;

FIG. 6 is a diagram of a packet format of still another objective change packet according to an embodiment of this application;

DETAILED DESCRIPTION OF ILLUSTRATIVE EMBODIMENTS

The following separately provides detailed descriptions by using specific embodiments.

Figure 1:
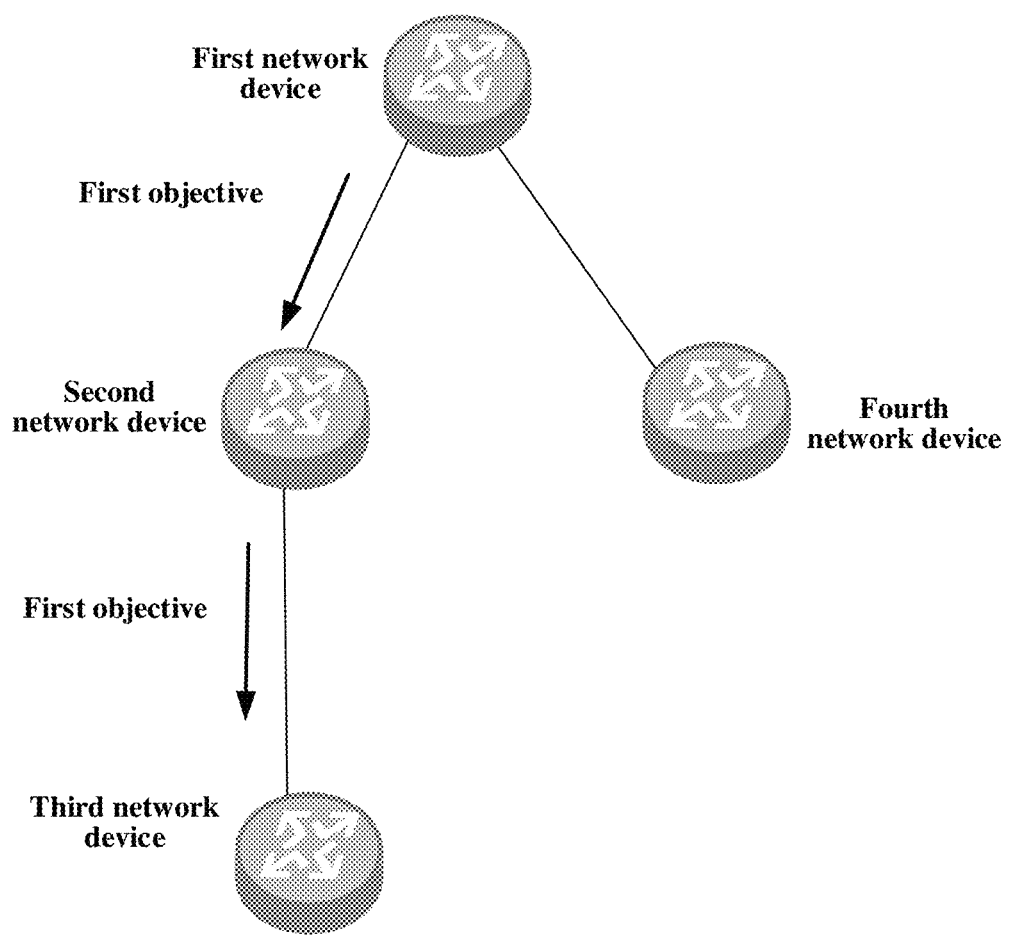
FIG. 1 is a schematic structural diagram of an ANIMA network according to an embodiment of this application.

FIG. 1 is a schematic structural diagram of an ANIMA network according to an embodiment of this application. As shown in FIG. 1, the ANIMA network includes a first network device, a second network device, and a third network device. The first network device communicates with the second network device, and the second network device communicates with the third network device. An ANIMA protocol is run on the first network device, the second network device, and the third network device. GRASP is run on the first network device, the second network device, and the third network device.

In the ANIMA network, the first network device, the second network device, and the third network device each enable an ASA based on GRASP. Therefore, when GRASP is run, the first network device, the second network device, and the third network device may be respectively referred to as a first ASA, a second ASA, and a third ASA. GRASP is a standard signaling protocol for interaction between the ASAs, so as to implement discovery, synchronization, negotiation, and flooding mechanisms between the ASAs. GRASP implements the discovery, synchronization, negotiation, and flooding mechanisms by transmitting an objective between the ASAs. Objectives may be classified into a discovery objective, a synchronization objective, a negotiation objective, and a flooding objective. The discovery objective is used in a GRASP discovery mechanism, the synchronization objective is used in a GRASP synchronization mechanism, the negotiation objective is used in a GRASP negotiation mechanism, and the flooding objective is used in a GRASP flooding mechanism. In the discovery mechanism, an ASA may discover another ASA by using the discovery objective. In the synchronization mechanism, an ASA may obtain a current parameter value in another ASA by using a synchronization objective request. In the negotiation mechanism, an ASA may initiate negotiation with another ASA by using the negotiation objective, to implement a parameter setting iterative interaction process between the ASAs. In the flooding mechanism, an ASA may flood another ASA with a value in the flooding objective by using the flooding objective. The objective may include a name and a value. The name is used to identify the objective, and the value is a configuration parameter that is included in the objective and that is used for the network device.

For example, the first network device in FIG. 1 serves as an initiator of an objective, and the first network device implements the discovery mechanism with the second network device by using GRASP. First, the first network device obtains a first objective, where the first objective is a discovery objective. The first network device may obtain the first objective that is configured by a network administrator, or may obtain the first objective from another network device (for example, a network management device). After obtaining the first objective, the first network device stores the first objective. The first network device may store the first objective in a buffer. Then, the first network device sends the first objective to the second network device. The first network device may add the first objective to a GRASP message, and sends the GRASP message to the second network device. In the discovery mechanism, the GRASP message may also be referred to as discovery message. After receiving the first objective, the second network device stores the first objective, and performs a configuration operation on the second network device by using the first objective. The second network device further sends a discovery response message to the first network device.

The GRASP message may include a loop count field, and the loop-count field is used to indicate a hop quantity for forwarding the GRASP message. A value in the loop-count field ranges from 0 to 255. The loop-count field ensures that the first objective may not only be sent to the second network device, but also sent to a network device at an interval greater than one hop from the first network device. For example, in FIG. 1, the second network device is further connected to the third network device. After receiving the first objective from the first network device, the second network device records a port that is on the second network device and that is used to receive the first objective. The second network performs the configuration operation on the second network device by using the first objective, and forwards the first objective to the third network device based on a value in the loop-count field in the GRASP message. After receiving the first objective, the third network device stores the first objective, and performs a configuration operation on the third network device by using the first objective. The third network device further sends a discovery response message to the first network device by using the second network device.

After obtaining the first objective, the first network device may send the first objective to a plurality of network devices. In FIG. 1, the first network device is further connected to a fourth network device. The first network device may send the first objective to the fourth network device, so that the fourth network device performs a configuration operation on the fourth network device by using the first objective.

In the foregoing implementation, the discovery mechanism is used as an example to describe an objective transmission process. In the synchronization mechanism, the negotiation mechanism, and the flooding mechanism, an objective transmission process is similar, and details are not described herein.

After the first network device sends the objective, the objective may be changed. The change includes that the objective is deleted and some or all values in the objective are modified. For example, due to a user configuration change, the original objective is deleted or an internet protocol version 6 (IPv6) address parameter included in the original objective is modified.

In an actual application scenario, for example, in FIG. 1, when the first objective locally stored in the first network device is changed, for example, the first objective locally stored in the first network device is deleted, the second network device or the third network device cannot perceive the change, where the first objective is used in the discovery mechanism. Therefore, the second network device or the third network device needs to wait for expiration of an aging time of the first objective, to clear the first objective stored in the second network device or the third network device. Alternatively, the second network device or the third network device needs to wait for a discovery mechanism re-initiated by the first network device, to clear the first objective stored in the second network device or the third network device. Therefore, the useless objective in the second network device or the third network device cannot be cleared in time, increasing CPU and storage resource occupation of the second network device or the third network device.

In this implementation of this application, after the first network device deploys the first objective on the second network device according to the foregoing implementation of this application, the first network device determines whether the locally stored first objective is changed. If the first network device determines that the locally stored first objective is changed, the first network device sends a first objective change packet to the second network device. The first objective change packet is used to indicate a change of the first objective, and the first objective change packet is used to trigger the second network device to change, according to the first objective change packet, the first objective locally stored in the second network device. The first objective locally stored in the second network device is the objective received by the second network device from the first network device.

In a possible implementation, if the first network device determines that the locally stored first objective is deleted, after receiving the first objective change packet, the second network device deletes, according to the first objective change packet, the first objective locally stored in the second network device.

In another possible implementation, if the first network device determines that some or all values included in the locally stored first objective are modified, after receiving the first objective change packet, the second network device updates, based on a new objective carried in the first objective change packet, the first objective locally stored in the second network device.

In the foregoing implementations, when a network device detects that a locally stored objective is changed, the network device automatically notifies a peer network device of the network device, of a change of the objective, so that the peer network device changes the locally stored objective in time. This helps the peer network device reduce CPU and storage resource occupation. For a specific implementation in which the peer network device changes, according to an objective change packet, the locally stored objective in time, refer to descriptions in subsequent embodiments of this application.

In addition, in the ANIMA network, any two network devices are a pair of peers. FIG. 1 is used as an example. The first network device and the second network device are a pair of peers, and the second network device and the third network device are a pair of peers. The "pair of peers" may be understood as one device is a peer of another device. For example, that the first network device and the second network device are a pair of peers may be understood as the first network device is a peer of the second network device, or the second network device is a peer of the first network device. The peer may also be referred to as a neighbor.

Figure 2:
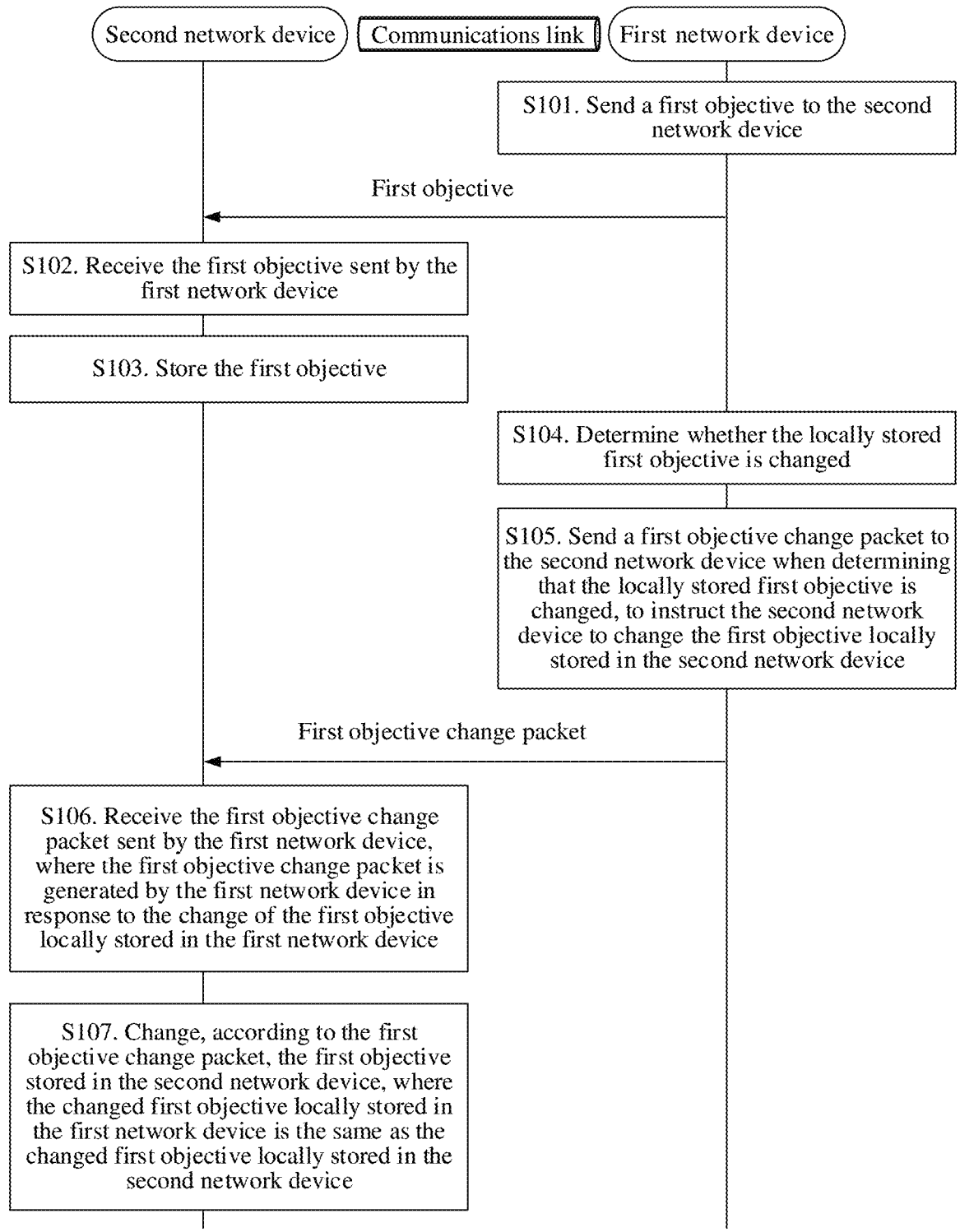
FIG. 2 is a flowchart of an ANIMA network information processing method according to an embodiment of this application.

FIG. 2 shows a flowchart of ANIMA network information processing method according to an embodiment of this application. The method shown in FIG. 2 may be applied to the ANIMA network shown in FIG. 1. The ANIMA network includes a first network device and a second network device. The method shown in FIG. 2 includes steps S101 to S107.

S101. The first network device sends a first objective to the second network device, where an ANIMA protocol is run on both the first network device and the second network device.

In the foregoing implementation, the first network device first obtains the first objective. The first network device may obtain the first objective that is configured by a network administrator, or may obtain the first objective from another network device (for example, a network management device). After obtaining the first objective, the first network device stores the first objective. The first network device may store the first objective in a buffer. The buffer may be a memory that implements temporary storage. The first objective may be an objective used by the first network device and the second network device during implementing a discovery mechanism, a synchronization mechanism, a negotiation mechanism, or a flooding mechanism.

The first objective includes a name and a value. The name is used to identify the objective, and the value is a configuration parameter that is included in the objective and that is used for the network device. The first network device may send the first objective to the second network device through a first port of the first network device, so as to deploy the first objective on the second network device. The first port of the first network device is connected to a communications link between the first network device and the second network device. The ANIMA protocol is run on both the first network device and the second network device. Therefore, the first network device and the second network device can implement a GRASP function. The first objective may be used to trigger the second network device to configure the second network device based on the first objective.

In a possible implementation, the first network device and the second network device may exchange a GRASP message, and the first objective may be carried in the GRASP message.

S102. The second network device receives the first objective sent by the first network device.

S103. The second network device stores the first objective.

The second network device may receive, through the communications link, the first objective sent by the first network device. For example, the second network device receives the GRASP message sent by the first network device, where the GRASP message carries the first objective. After receiving the GRASP message, the second network device obtains the first objective, and stores the first objective in a buffer of the second network device, where the buffer may be a memory that implements temporary storage. The second network device may further determine, based on an message_TYPE carried in the GRASP message, that the first objective is an objective used in a specific mechanism in the foregoing mechanisms. Then, the second network device configures the second network device based on a value included in the first objective.

S104. The first network device determines whether the locally stored first objective is changed.

In the foregoing implementation, a change of the first objective may include that the first objective is deleted or a value included in the first objective is modified. That a value included in the first objective is modified may include that some values are modified or all values are modified. For example, the first objective includes an IPv6 address, and due to a user configuration change, an IPv6 address parameter included in the first objective is modified.

S105. The first network device sends a first objective change packet to the second network device when the first network device determines that the locally stored first objective is changed, to instruct the second network device to change the first objective that is from the first network device and that is locally stored in the second network device.

When the first network device determines that the locally stored first objective is changed, the first network device generates the first objective change packet based on the change of the first objective. The first objective change packet is used to indicate the change of the first objective. In a possible implementation, the first objective is deleted, and the first objective change packet is used to indicate that the first objective is deleted. In another possible implementation, a value included in the first objective is modified, and the first objective change packet is used to indicate a modified first objective. The first network device sends the first objective change packet to the second network device through the first port of the first network device. The first objective change packet is used to trigger the second network device to correspondingly change, according to the first objective change packet, the first objective that is from the first network device and that is locally stored in the second network device. After the second network device performs a change operation, the changed first objective locally stored in the first network device is the same as the changed first objective locally stored in the second network device.

Figure 3:
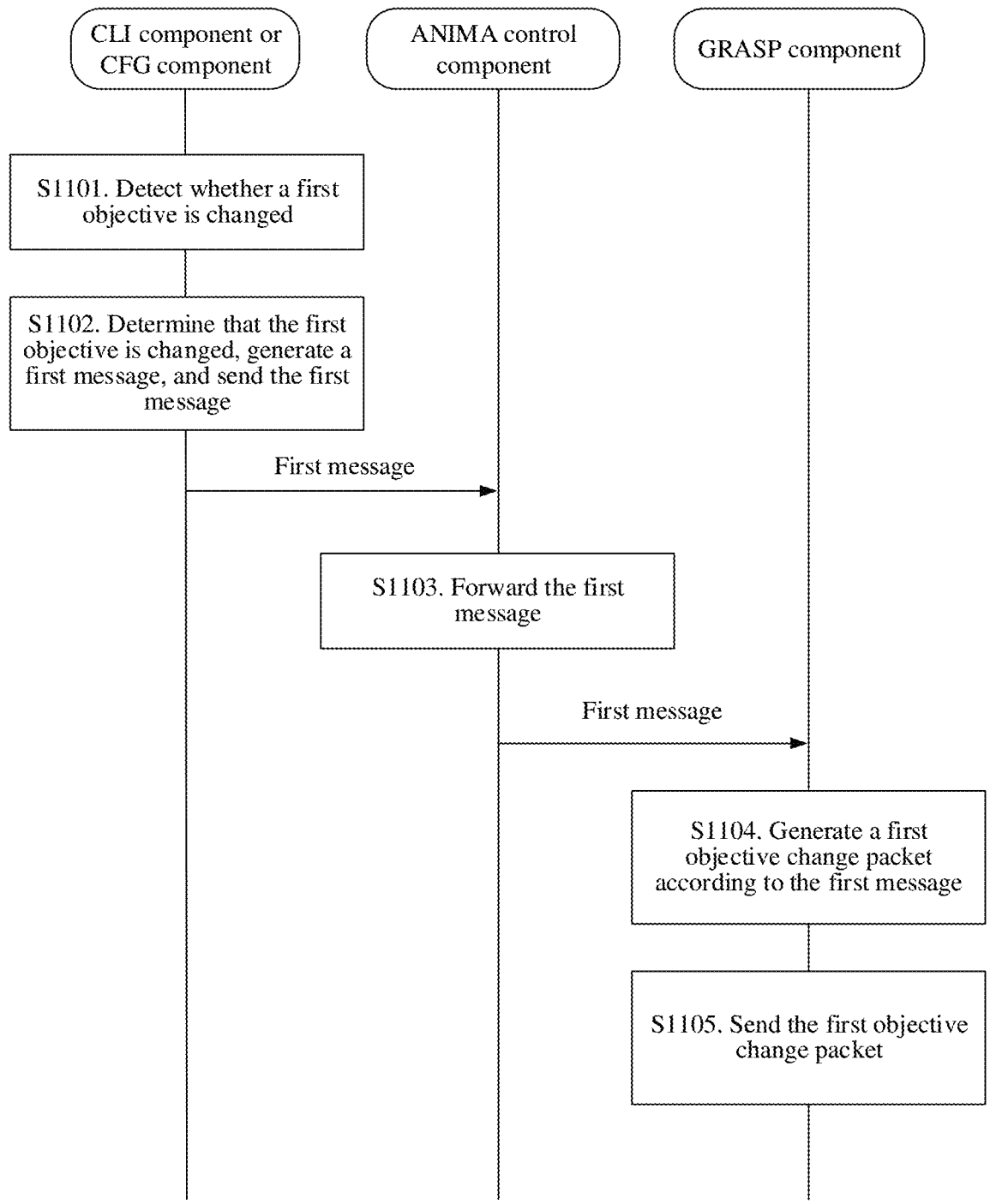
FIG. 3 is a flowchart of a method for generating and sending an objective change packet according to an embodiment of this application.

The following uses FIG. 3 as an example to describe an implementation in which the first network device determines that the first objective is changed, and generates and sends the first objective change packet.

As shown in FIG. 3, the first network device may include an ANIMA control component and a GRASP component. The ANIMA control component is configured to manage and schedule another component in the first network device, and the GRASP component is configured to implement a GRASP function. In this embodiment of this application, the GRASP component is further configured to generate and send the first objective change packet. The first network device may further include a configurator (CFG) component and/or a command line interface (CLI) component. The CFG component is configured to manage and configure a configuration file. The CLI component is used for interaction between a user and the first network device. The ANIMA control component, the GRASP component, the CFG component, and the CLI component may be implemented in a hardware manner, or may be implemented in a manner of executing a software instruction by a processor. The method shown in FIG. 3 includes steps S1101 to S1105.

S1101. The CLI component or the CFG component detects whether the first objective is changed.

The first network device may detect, by using the CLI component or the CFG component, whether the first objective is changed. For example, a user changes a value in the first objective by using the CLI component, a user deletes the first objective by using the CLI component, or a user inputs a new first objective by using the CLI component. In this case, the CLI component may determine that the first objective is changed. For another example, based on a configuration change request of a user, the ANIMA control component invokes the CFG component to reconfigure the first objective. In this case, the CFG component may determine that the first objective is changed.

S1102. The CLI component or the CFG component determines that the first objective is changed, generates a first message, and sends the first message to the ANIMA control component.

When the first objective is changed, the CLI component or the CFG component may generate the first message, where the first message is used to indicate the change of the first objective. In a possible implementation, the change is that the first objective is deleted, and the first message includes a name of the first objective and an initiator. The initiator is used to indicate a network device that initiates the first objective, or may be understood as a network device that initiates a discovery mechanism, a synchronization mechanism, a negotiation mechanism, or a flooding mechanism. The first message may carry no value in the first objective. This indicates that the change indicated in the first message is deleting the first objective. Optionally, the first message may further include a change type, and the change type is set to delete. Optionally, when the change type is set to delete, the first message may further include a value in the first objective. This indicates that the value in the first objective is deleted.

In another possible implementation, the change is that the value in the first objective is modified, and the first message includes a modified first objective and initiator. If the first message carries the modified first objective, it indicates that the change indicated in the first message is modifying the first objective. Optionally, the first message may further include a change type, and the change type is set to modify. Optionally, when the change type is set to modify, the first message carries no modified first objective, but carries a new value of a specific modified parameter value, and the first message further carries a parameter type of the new value, where the parameter type is used to indicate the new value.

After generating the first message, the CLI component or the CFG component sends the first message to the ANIMA control component. A format of the first message may be a format used by the network device for transmitting an internal message, for example, a socket message.

S1103. The ANIMA control component forwards the first message to the GRASP component.

S1104. The GRASP component generates the first objective change packet according to the first message.

S1105. The GRASP component sends the first objective change packet.

As previously mentioned, the ANIMA control component is configured to manage and schedule the another component in the first network device. After receiving the first message, the ANIMA control component determines that the first message is used to indicate the change of the first objective, and sends the first message to the GRASP component. After receiving the first message, the GRASP component may generate the first objective change packet based on information in the first message. Then, the GRASP component sends the first objective change packet to the second network device. For a specific implementation of the first objective change packet, refer to subsequent descriptions in this application.

The foregoing steps S1101 to S1105 describe an implementation in which the CLI component or the CFG component actively reports the change of the first objective to the GRASP component by using the ANIMA control component. In another implementation, the GRASP component may actively make a request to the ANIMA control component, to query the ANIMA control component whether the first objective is changed. The ANIMA control component invokes the CLI component or the CFG component to perform the reporting. For a process in which the CLI component or the CFG component performs the reporting, refer to the foregoing descriptions in steps S1101 to S1105, and details are not described herein again.

S106. The second network device receives the first objective change packet sent by the first network device, where the first objective change packet is generated by the first network device in response to the change of the first objective locally stored in the first network device.

S107. The second network device changes, according to the first objective change packet, the first objective that is from the first network device and that is stored in the second network device, where the changed first objective locally stored in the first network device is the same as the changed first objective locally stored in the second network device.

The first network device sends the first objective change packet to the second device through the first port of the first network device. The second network device may receive the first objective change packet through the communications link. After receiving the first objective change packet, the second network device parses the first objective change packet, and determines the change type, indicated in the first objective change packet, of the first objective. When the second network device determines that the change type is deleting the first objective, the second network device deletes the first objective that is from the first network device and that is stored in the second network device. When the second network device determines that the change type is modifying a value in the first objective, the second network device modifies, based on a new first objective carried in the first objective change packet, the first objective that is from the first network device and that is stored in the second network device. The second network device may replace the first objective stored in the second network device with the new first objective carried in the first objective change packet. Modifying the value in the first objective may include modifying some values or modifying all values. In another exchangeable implementation, when the change type is modifying the value in the first objective, the first objective change packet carries no new first objective, but carries a specific modified parameter value in the first objective. After obtaining the modified parameter value, the second network device replaces a corresponding parameter value in the first objective stored in the second network device, with the modified parameter value. After the second network device performs a change operation, the changed first objective locally stored in the first network device is the same as the changed first objective locally stored in the second network device.

In the foregoing implementation, in the ANIMA network, when a network device detects that a locally stored objective is changed, the network device automatically notifies a peer network device of the network device, of a change of the objective, so that the peer network device changes the locally stored objective in time. This helps the peer network device reduce CPU and storage resource occupation. The foregoing implementation describes an implementation in which the first network device sends the first objective change packet to the second network device. It should be noted that the first network device may send the objective change packet to a plurality of network devices in the foregoing manner. After receiving the objective change packet sent by the first network device, the second network device may continue to forward the objective change packet to a next-hop network device of the second network device in the foregoing manner.

Based on the description in the foregoing implementation, optionally, the first network device obtains an ANIMA disabling message, where the ANIMA disabling message is used to instruct the first network device to disable an ANIMA function of the first port, and the first port is a port through which the first network device sends the first objective to the second network device. Before the first network device disables the ANIMA function of the first port according to the ANIMA disabling message, the first network device sends a second objective change packet to the second network device, to instruct the second network device to delete, according to the second objective change packet, the first objective locally stored in the second network device.

In the foregoing implementation of this application, when the first network device detects that the first objective is changed, the first network device may send the first objective change packet to the second network device, to trigger the second network device to change, according to the first objective change packet, the first objective locally stored in the second network device.

The ANIMA function of the first port used by the first network device to send the first objective may be disabled. For example, due to a configuration change, the ANIMA function is no longer run on the first interface. In this case, the first network device may obtain the ANIMA disabling message for the first port, where the ANIMA disabling message is used to instruct the first network device to disable the ANIMA function of the first port. The first network device parses the ANIMA disabling message, and before disabling the ANIMA function of the first port, the first network device sends a second objective change packet to the second network device. The second network device deletes, according to the second objective change packet, the first objective locally stored in the second network device. For implementations of obtaining the ANIMA disabling message and generating and sending the second objective change packet, refer to the descriptions in the foregoing implementations of this application, for example, refer to the implementations in FIG. 2 and FIG. 3. Details are not described herein again.

In the foregoing implementation, when a port of a network device exits an ANIMA domain, the network device automatically notifies a peer network device of the network device, of an exit of the ports from the ANIMA domain, so that the peer network device deletes a locally stored objective in time. This helps the peer network device reduce CPU and storage resource occupation. It should be noted that the network device may perform global disabling. The global disabling means that the entire network device exits the ANIMA domain. This may be equivalent to that an ANIMA function is disabled for all ports running the ANIMA function on the network device. For an implementation for each port, refer to the foregoing implementation. Details are not described herein again.

Based on the description in the foregoing implementation, optionally, the second network device forwards the first objective to a third network device. The second network device determines whether a communications link is faulty, where the communications link is a communications link through which the second network device receives the first objective sent by the first network device. When the second network device determines that the communications link is faulty, the second network device sends a second objective change packet to the third network device, to instruct the third network device to delete, according to the second objective change packet, the first objective locally stored in the third network device.

As shown in FIG. 1, the second network device may be connected to the third network device. Based on the descriptions in the foregoing implementations, after receiving the first objective, the second network device may forward the first objective to the third network device through a communications link between the second network device and the third network device, and the third network device may store the first objective, and configure the third network device based on the first objective.

According to a definition of GRASP, when receiving the first objective, the second network device not only stores the first objective, but also records information about a port through which the second network device receives the first objective. On the second network device, there is a correspondence between the first objective and the port through which the second network device receives the first objective.

The second network device further determines whether the communications link between the first network device and the second network device is faulty, where the communications link is used to transmit the first objective. When the second network device finds that the communications link is faulty, the second network device disables the port through which the second network device is connected to the communications link. Because the second network device records the receive port when receiving the first objective sent by the first network device, the second network device can determine, based on the foregoing correspondence, that the disabled port is the port through which the first objective is received. The second network device generates the second objective change packet, where the second objective change packet is used to indicate that the first objective needs to be deleted. The second network device sends the second objective change packet to the third network device, where the second objective change packet is used to trigger the third network device to delete, according to the second objective change packet, the first objective locally stored in the third network device.

In the foregoing implementation, when a network device finds that an upstream link through which an objective is received is faulty, the network device automatically instructs a downstream peer network device of the network device to delete the objective, so that the downstream peer network device deletes the locally stored objective in time. This helps the downstream peer network device reduce CPU and storage resource occupation.

Optionally, the first objective change packet is a GRASP message, the GRASP message includes a first identifier, and the first identifier is used to indicate that the GRASP message is an objective change packet. Further, optionally, the GRASP message further includes a second identifier, and the second identifier is used to indicate a change type of the first objective locally stored in the second network device.

As described above, the first network device, the second network device, and the third network device may exchange the GRASP message, and the GRASP message may be used to implement the first objective change packet. In a possible implementation, an existing GRASP message defined in GRASP may be reused to implement the first objective change packet. In another possible implementation, a new GRASP message may be defined in GRASP to implement the first objective change packet.

For example, FIG. 4 shows a packet format of the first objective change packet implemented by reusing an existing GRASP message defined in GRASP. In a process of describing FIG. 4, for ease of description, the GRASP message shown in FIG. 4 is referred to as a first GRASP message.

As shown in FIG. 4, the first GRASP message includes a time to live (time-to-live, TTL). In GRASP, the TTL is used to indicate a time to live of an objective in a network device, where the objective is carried in the first GRASP message. A length of the TTL is 32 bits and ranges from 0 ms to 4294967295 ms, where ms represents millisecond. In this application, the first identifier is implemented by reusing the TTL in the first GRASP message, and the first identifier is used to indicate that the first GRASP message is the first objective change packet. When a value of the TTL is all Fs, the TTL is defined as the first identifier. To be specific, when the value of the TTL is all Fs, it indicates that the first GRASP message is the first objective change packet, to indicate the change of the first objective.

The first GRASP message may further include a message_type, a session identifier, an initiator, an objective name, an objective flag, and a loop count. Optionally, the first GRASP message may further include an objective value. The message type is used to indicate a type of the first GRASP message. For example, M_DISCOVERY indicates a GRASP message used in a discovery mechanism. The session-id is an identifier of a GRASP session. The initiator is an initiator of the mechanism mentioned in this application, and is also an initiator of the first objective mentioned in this application, for example, the first network device in this application. The objective name is a name of the objective defined in the foregoing embodiment of this application. The objective value is a value included in the objective defined in the foregoing embodiment of this application. The objective flag is used to indicate a discovery session, a negotiation session, a synchronization session, or dry-run negotiation. The loop-count is used to indicate a propagation range of the first GRASP message. For example, a value 1 indicates that the first GRASP message may be propagated to the second network device, and a value 2 indicates that the first GRASP message may be propagated to the third network device.

For example, descriptions are provided with reference to the implementation, described in the foregoing embodiment, in which the first objective is deleted and the implementation, described in the foregoing embodiment, in which the value included in the first objective is modified. The first GRASP message that is sent by the first network device and that is received by the second network device includes the first identifier. If the first identifier is the TTL, and a value of the TTL is all Fs, it indicates that the first GRASP message is the first objective change packet. If the first GRASP message includes the objective name, but does not include the objective value, it indicates that the first GRASP message is an object change packet used to instruct to delete the first objective. If the first GRASP message includes both the objective name and the objective value, it indicates that the first GRASP message is an objective change packet used to instruct to modify a value included in the first objective. The first GRASP message may carry a second objective, the second objective includes a modified value, and the second objective is used to replace the first objective. The objective value in the first GRASP message is a value in the second objective.

For example, FIG. 5 shows a packet format of the first objective change packet implemented by using a new GRASP message defined in GRASP. In a process of describing FIG. 5, for ease of description, the GRASP message shown in FIG. 5 is referred to as a second GRASP message.

As shown in FIG. 5, the second GRASP message includes a message type. The message type is redefined in this application. For example, a value of the message type is set to 98 (representing: M_DELETE), indicating that the second GRASP message is the first objective change packet. Therefore, the newly defined message type is equivalent to the foregoing first identifier. Optionally, the second GRASP message further includes an objective flag. In this application, the objective flag is redefined. For example, a value of the objective flag is set to 5 (representing: F_DEL), indicating that the second GRASP message is an objective change packet used to instruct to delete the first objective. For example, a value of the objective flag is set to 4

(representing: F_MODIFY), indicating that the second GRASP message is an objective change packet used to instruct to modify a value included in the first objective. Therefore, the newly defined objective flag is equivalent to the foregoing second identifier.

The second GRASP message may further include a session-id, an initiator, an objective name, an objective flag, and a loop-count. Optionally, the second GRASP message may further include an objective value. For explanations of the fields included in the second GRASP message, refer to the foregoing embodiment.

For example, descriptions are provided with reference to the implementation, described in the foregoing embodiment, in which the first objective is deleted and the implementation, described in the foregoing embodiment, in which the value included in the first objective is modified. The second GRASP message that is sent by the first network device and that is received by the second network device includes the first identifier. The first identifier is the message type, and a value of the message type is 98 (representing: M_DELETE), indicating that the second GRASP message is the first objective change packet. If the second GRASP message includes the objective name, but does not include the objective value, it indicates that the second GRASP message is an object change packet used to instruct to delete the first objective. If the second GRASP message includes both the objective name and the objective value, it indicates that the second GRASP message is an objective change packet used to instruct to modify a value included in the first objective. The second GRASP message may carry a second objective, the second objective includes a modified value, and the second objective is used to replace the first objective. The objective value in the second GRASP message is a value in the second objective.

In another possible implementation, the second GRASP message includes the first identifier, and further includes a second identifier. The second identifier is the objective flag. A value of the objective flag is set to 5 (representing: F_DEL), indicating that the second GRASP message is an objective change packet used to instruct to delete the first objective. A value of the objective flag is set to 4 (representing: F_MODIFY), indicating that the second GRASP message is an objective change packet used to instruct to modify a value included in the first objective. In this case, a network device does not need to determine a change type based on whether the second GRASP message includes the objective value, but determines the change type based on the objective flag.

For example, FIG. 6 shows an implementation in which an objective is added on a basis of the implementation shown in FIG. 5. To be specific, the second GRASP message may carry a plurality of objectives. In this case, a network device may perform an operation on the plurality of objectives according to one objective change message. This helps save a transmission bandwidth and CPU resource occupation. For a specific implementation of FIG. 6, refer to the foregoing description in FIG. 5. Details are not described herein again.

It should be noted that the second objective change packet mentioned in this application may also be implemented in the foregoing manner in FIG. 4 to FIG. 6. Details are not described herein again.

Figure 7:
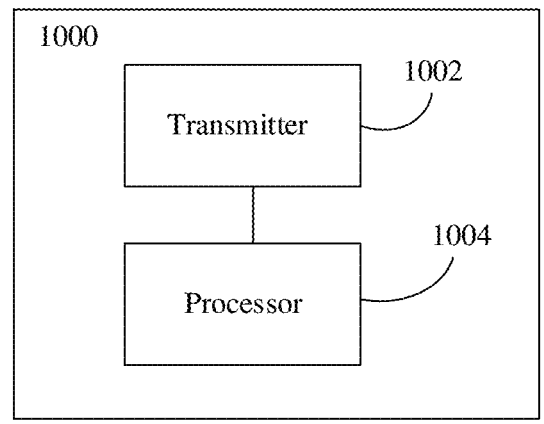
FIG. 7 is a schematic structural diagram of a first network device according to an embodiment of this application.

FIG. 7 is a schematic structural diagram of a first network device 1000 according to an embodiment of this application. The first network device 1000 shown in FIG. 7 may perform a corresponding step performed by the first network device in the method in the foregoing embodiment. The first network device is deployed in an ANIMA network, and the ANIMA network further includes a second network device. As shown in FIG. 7, the first network device 1000 includes a sending unit 1002 and a processing unit 1004.

The sending unit 1002 is configured to send a first objective to the second network device, where an ANIMA protocol is run on both the first network device and the second network device.

The processing unit 1004 is configured to determine whether the locally stored first objective is changed.

The sending unit 1002 is further configured to send a first objective change packet to the second network device when the processing unit 1004 determines that the locally stored first objective is changed, to instruct the second network device to change the first objective that is from the first network device and that is locally stored in the second network device, where the changed first objective locally stored in the first network device is the same as the changed first objective locally stored in the second network device.

Optionally, that the processing unit 1004 is configured to determine whether the locally stored first objective is changed includes the processing unit 1004 is configured to determine whether the locally stored first objective is deleted, and that the sending unit 1002 is further configured to send a first objective change packet to the second network device when the processing unit 1004 determines that the locally stored first objective is changed, to instruct the second network device to change the first objective that is from the first network device and that is locally stored in the second network device includes when the processing unit 1004 determines that the locally stored first objective is deleted, the sending unit 1002 is further configured to send the first objective change packet to the second network device, to instruct the second network device to delete the first objective that is from the first network device and that is locally stored in the second network device.

Optionally, that the processing unit 1004 is configured to determine whether the locally stored first objective is changed includes the processing unit 1004 is configured to determine whether the locally stored first objective is modified, and that the sending unit 1002 is further configured to send a first objective change packet to the second network device when the processing unit 1004 determines that the locally stored first objective is changed, to instruct the second network device to change the first objective that is from the first network device and that is locally stored in the second network device includes when the processing unit 1004 determines that the locally stored first objective is modified, the sending unit 1002 is further configured to send the first objective change packet to the second network device, to instruct the second network device to modify the first objective that is from the first network device and that is locally stored in the second network device.

Optionally, the processing unit 1004 is further configured to obtain an ANIMA disabling message, where the ANIMA disabling message is used to instruct the processing unit 1004 to disable an ANIMA function of a first port, and the first port is a port through which the sending unit 1002 sends the first objective to the second network device. Before the processing unit 1004 disables the ANIMA function of the first port according to the ANIMA disabling message, the sending unit 1002 is further configured to send a second objective change packet to the second network device, to instruct the second network device to delete, according to the second objective change packet, the first objective that is from the first network device and that is locally stored in the second network device.

The first network device shown in FIG. 7 may perform a corresponding step performed by the first network device in the method in the foregoing embodiments. In an ANIMA network scenario, when a network device detects that a locally stored objective is changed, the network device automatically notifies a peer network device of the network device, of a change of the objective, so that the peer network device changes the locally stored objective in time. This helps the peer network device reduce CPU and storage resource occupation.

Figure 8:
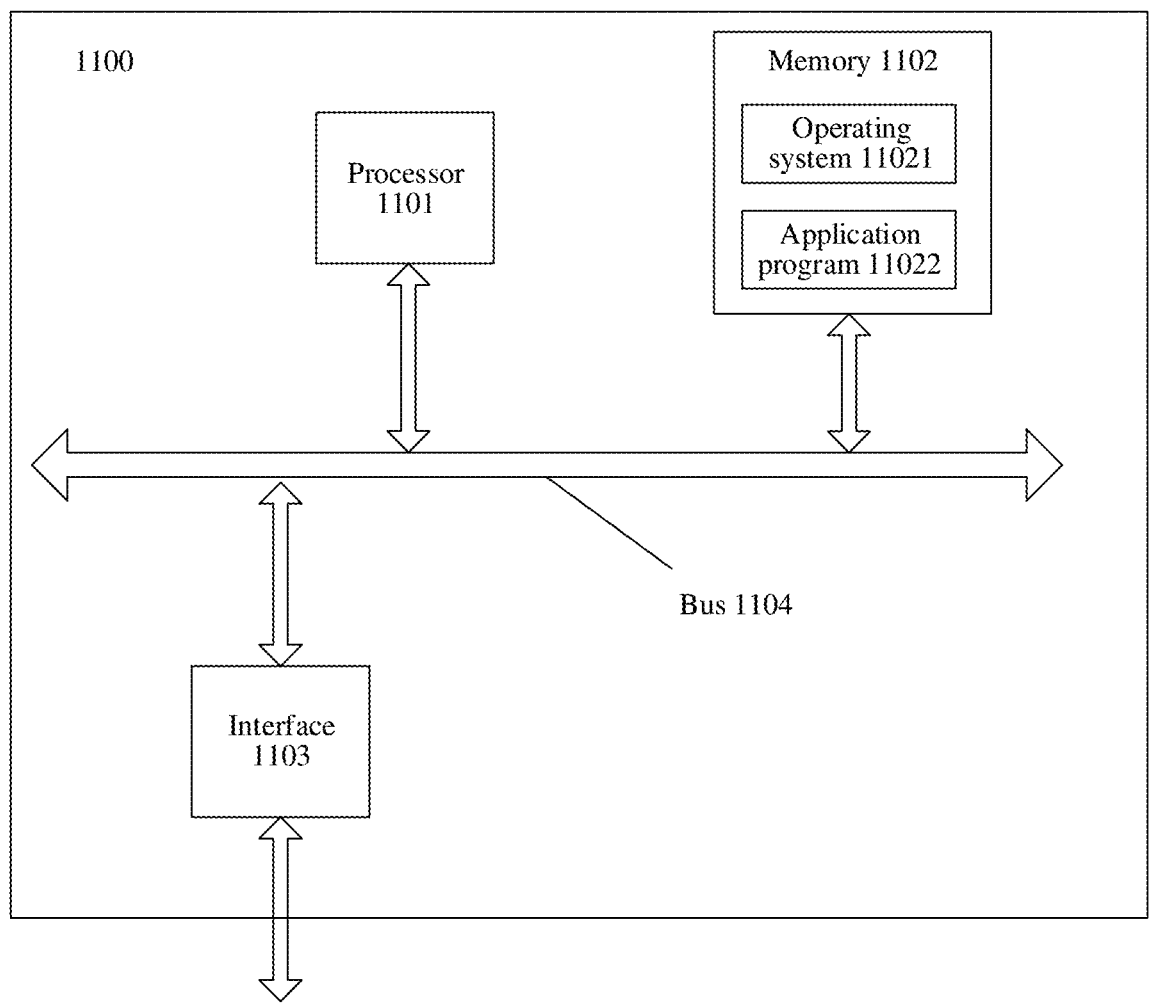
FIG. 8 is a schematic diagram of a hardware structure of a first network device according to an embodiment of this application.

FIG. 8 is a schematic diagram of a hardware structure of a first network device 1100 according to an embodiment of this application. The first network device 1100 shown in FIG. 8 may perform a corresponding step performed by the first network device in the method in the foregoing embodiments.

As shown in FIG. 8, the first network device 1100 includes a processor 1101, a memory 1102, an interface 1103, and a bus 1104. The interface 1103 may be implemented in a wireless or wired manner, and may be a network adapter. The processor 1101, the memory 1102, and the interface 1103 are connected through the bus 1104.

The interface 1103 may include a transmitter and a receiver, and is configured to send and receive information between the first network device and the second network device in the foregoing embodiments. For example, the interface 1103 is configured to support sending of a first objective and a first objective change packet to the second network device. For example, the interface 1103 is configured to support processes S101 and S105 in FIG. 2. The processor 1101 is configured to perform processing performed by the first network device in the foregoing embodiments. For example, the processor 1101 is configured to determine whether the locally stored first objective is changed, and/or is configured to perform another process in the technology described in this specification. For example, the processor 1101 is configured to support the process S104 in FIG. 2. The memory 1102 includes an operating system 11021 and an application program 11022, and is configured to store a program, code, or an instruction. When executing the program, code, or instruction, the processor or a hardware device may complete a processing process of the first network device in the foregoing method embodiments. Optionally, the memory 1102 may include a read-only memory (ROM) and a random access memory (RAM). The ROM includes a basic input/output system (BIOS) or an embedded system, and the RAM includes an application program and an operating system. When the first network device 1100 needs to run, a bootloader in the BIOS or the embedded system that is integrated into the ROM is used to boot a system to start, and boot the first network device 1100 to enter a normal running state. After entering the normal running state, the first network device 1100 runs the application program and the operating system in the RAM, to complete the processing processes performed by the first network device in the method embodiments.

It may be understood that FIG. 8 merely shows a simplified design of the first network device 1100. In actual application, the first network device may include any quantity of interfaces, processors, or memories.

Figure 9:
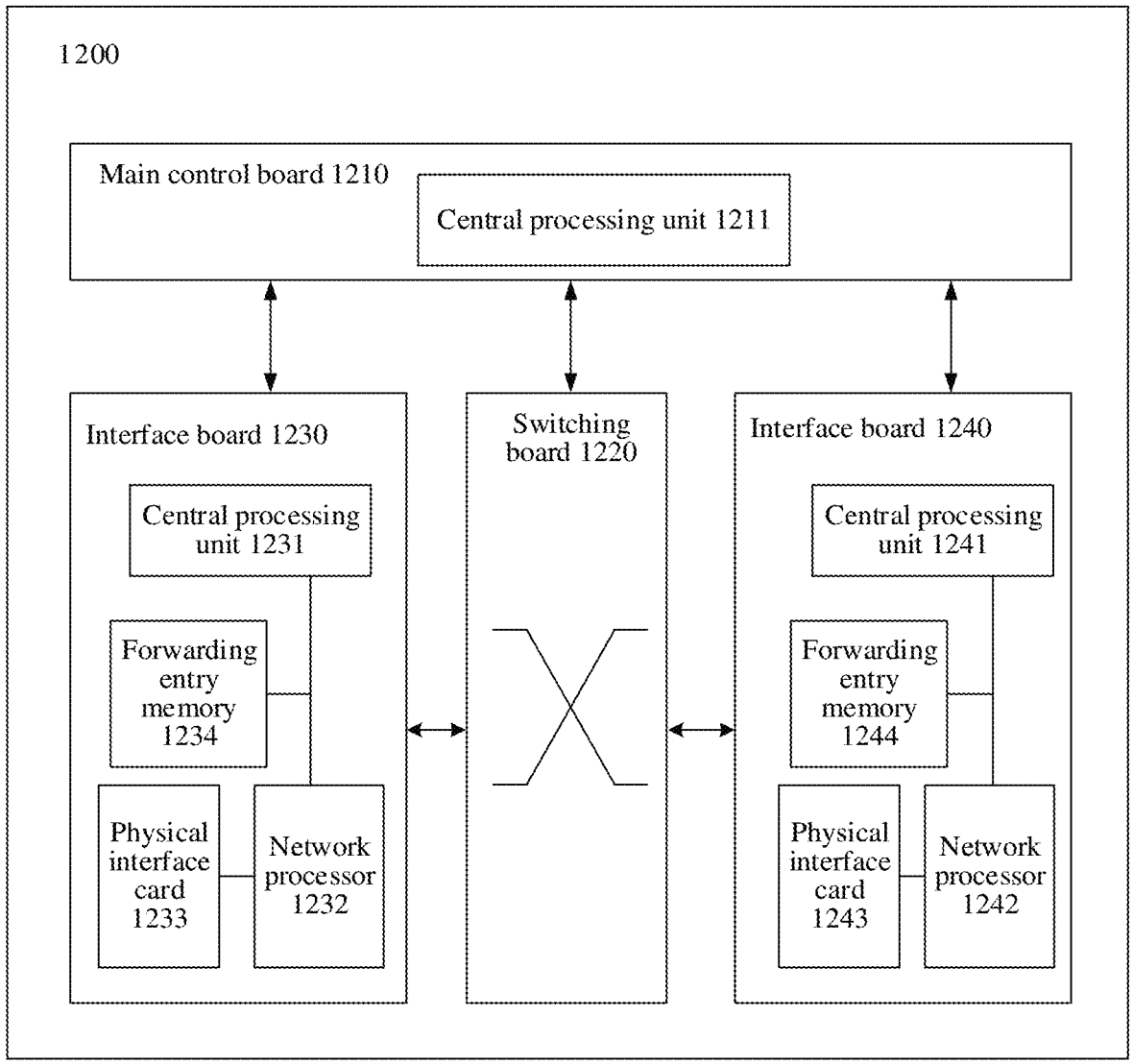
FIG. 9 is a schematic diagram of a hardware structure of another first network device according to an embodiment of this application.

FIG. 9 is a schematic diagram of a hardware structure of another first network device 1200 according to an embodiment of this application. The first network device 1200 shown in FIG. 9 may perform a corresponding step performed by the first network device in the method in the foregoing embodiments.

As shown in FIG. 9, the first network device 1200 includes a main control board 1210, an interface board 1230, a switching board 1220, and an interface board 1240. The main control board 1210, the interface boards 1230 and 1240, and the switching board 1220 are connected to a system backplane through a system bus for interworking. The main control board 1210 is configured to complete functions such as system management, device maintenance, and protocol processing. The switching board 1220 is configured to complete data exchange between interface boards (the interface board is also referred to as a line board or a service board). The interface boards 1230 and 1240 are configured to provide various service interfaces (for example, a POS interface, a GE interface, and an ATM interface), and forward a data packet.

The interface board 1230 may include a central processing unit 1231, a forwarding entry memory 1234, a physical interface card 1233, and a network processor 1232. The central processing unit 1231 is configured to control and manage the interface board, and communicate with a central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to receive and send the traffic.

The physical interface card 1233 is configured to send a first objective and a first objective change packet to the second network device.

A central processing unit 1211 is further configured to determine whether the locally stored first objective is changed. When determining that the locally stored first objective is changed, the central processing unit 1211 triggers the physical interface card 1233 to send the first objective change packet to the second network device.

The central processing unit 1211 is further configured to generate the first objective and the first objective change packet. The central processing unit 1211 sends the first objective and the first objective change packet to the physical interface card 1233 by using the central processing unit 1231. The physical interface card 1233 sends the first objective and the first objective change packet to the second network device.

The central processing unit 1231 is further configured to control the network memory 1232 to obtain the forwarding entry in the forwarding entry memory 1234, and the central processing unit 1231 is further configured to control the network memory 1232 to send and receive the traffic by using the physical interface card 1233.

It should be understood that operations of the interface board 1240 are the same as operations of the interface board 1230 in this embodiment of the present invention. For brevity, details are not described again. It should be understood that the first network device 1200 in this embodiment may perform the corresponding functions and/or various steps in the foregoing method embodiments. Details are not described herein again.

In addition, it should be noted that there may be one or more main control boards. When there are a plurality of main control boards, a primary main control board and a secondary main control board may be included. There may be one or more interface boards. A first network device with a stronger data processing capability provides more interface boards. There may also be one or more physical interface cards on the interface board. There may be no switching board or one or more switching boards. When there are a plurality of switching boards, the switching boards may share load and implement redundancy backup. In a centralized forwarding architecture, a first network device may need no switching board, and the interface board implements a service data processing function of an entire system. In a distributed forwarding architecture, a first network device may have at least one switching board, and exchange data between a plurality of interface boards by using the switching board, to provide a large-capacity data exchange and processing capability. Therefore, a data access and processing capability of the first network device in the distributed architecture is better than that of the first network device in the centralized architecture. Which architecture is used depends on a specific networking deployment scenario, and is not limited herein.

Figure 10:
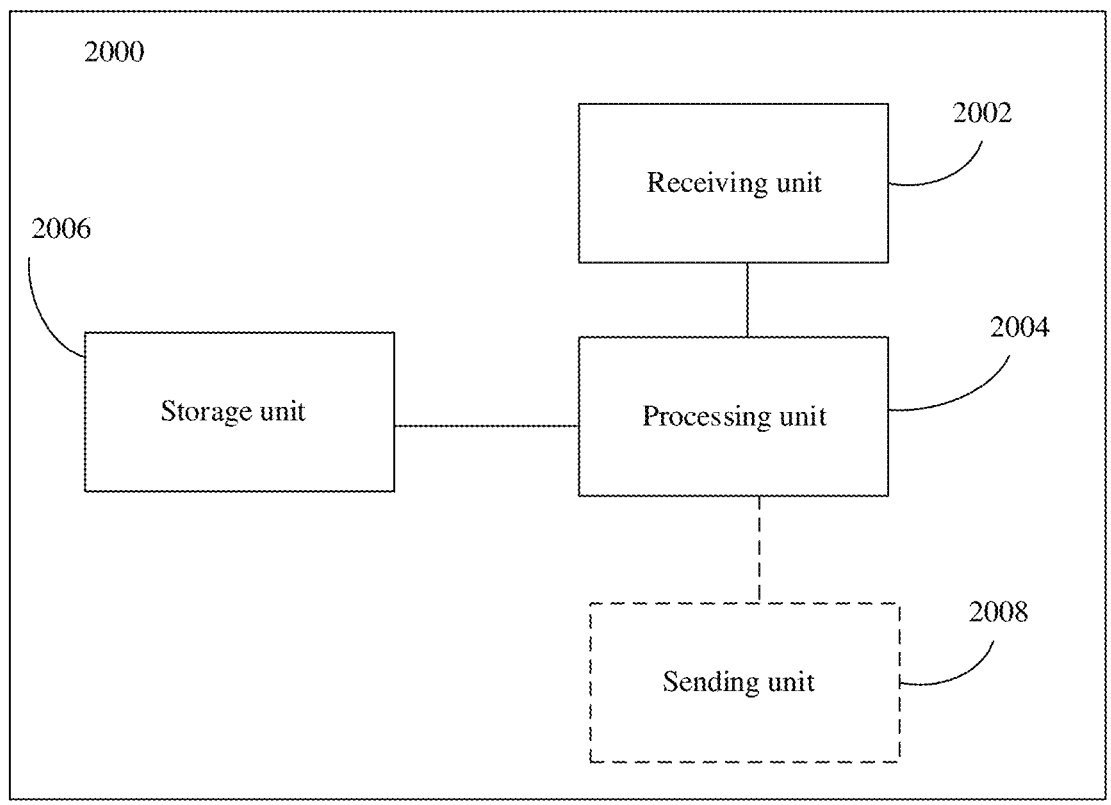
FIG. 10 is a schematic structural diagram of a second network device according to an embodiment of this application.

FIG. 10 is a schematic structural diagram of a second network device 2000 according to an embodiment of this application. The second network device 2000 shown in FIG. 10 may perform a corresponding step performed by the second network device in the method in the foregoing embodiments. The second network device is deployed in an ANIMA network, and the ANIMA network further includes a first network device. As shown in FIG. 10, the second network device 2000 includes a receiving unit 2002, a processing unit 2004, and a storage unit 2006.

The receiving unit 2002 is configured to receive a first objective sent by the first network device, where an ANIMA protocol is run on both the first network device and the second network device.

The storage unit 2006 is configured to store the first objective.

The receiving unit 2002 is further configured to receive a first objective change packet sent by the first network device, where the first objective change packet is generated by the first network device in response to a change of the first objective locally stored in the first network device.

The processing unit 2004 is configured to change, according to the first objective change packet, the first objective stored in the storage unit 2006, where the changed first objective locally stored in the first network device is the same as the changed first objective locally stored in the storage unit 2006.

Optionally, that the processing unit 2004 is configured to change, according to the first objective change packet, the first objective stored in the storage unit 2006 includes the processing unit 2004 is configured to delete, according to the first objective change packet, the first objective stored in the storage unit 2006.

Optionally, that the processing unit 2004 is configured to change, according to the first objective change packet, the first objective stored in the storage unit 2006 includes the processing unit 2004 is configured to modify, according to the first objective change packet, the first objective stored in the storage unit 2006.

Optionally, the second network device further includes a sending unit 2008, configured to forward the first objective to a third network device. The processing unit 2004 is further configured to determine whether a first communications link is faulty, where the first communications link is a communications link through which the receiving unit 2002 receives the first objective sent by the first network device. When the processing unit 2004 determines that the first communications link is faulty, the sending unit 2008 is further configured to send a second objective change packet to the third network device, to instruct the third network device to delete the first objective locally stored in the third network device.

The second network device shown in FIG. 10 may perform a corresponding step performed by the second network device in the method in the foregoing embodiments. In an ANIMA network scenario, when a network device detects that a locally stored objective is changed, the network device automatically notifies a peer network device of the network device, of a change of the objective, so that the peer network device changes the locally stored objective in time. This helps the peer network device reduce CPU and storage resource occupation.

Figure 11:
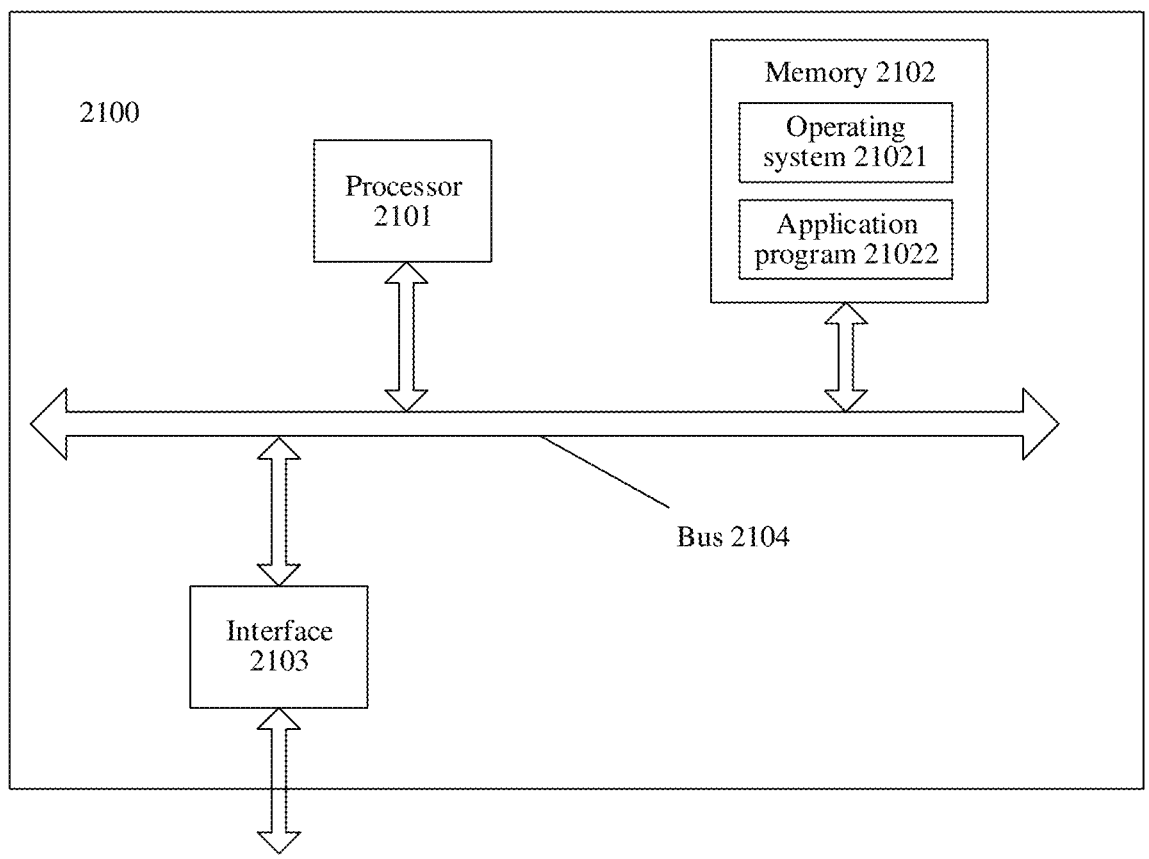
FIG. 11 is a schematic diagram of a hardware structure of a second network device according to an embodiment of this application.

FIG. 11 is a schematic diagram of a hardware structure of a second network device 2100 according to an embodiment of this application. The second network device 2100 shown in FIG. 11 may perform a corresponding step performed by the second network device in the method in the foregoing embodiments.

As shown in FIG. 11, the second network device 2100 includes a processor 2101, a memory 2102, an interface 2103, and a bus 2104. The interface 2103 may be implemented in a wireless or wired manner, and may be a network adapter. The processor 2101, the memory 2102, and the interface 2103 are connected through the bus 2104.

The interface 2103 may include a transmitter and a receiver, is configured to send and receive information between the second network device and the first network device in the foregoing embodiment, or is configured to send and receive information between the second network device and the third network device in the foregoing embodiment. For example, the interface 2103 is configured to support receiving of a first objective and a first objective change packet that are sent by the first network device, or support sending of a first objective and a second objective change packet to the third network device. For example, the interface 2103 is configured to support the processes of S102 and S106 in FIG. 2. The processor 2101 is configured to perform processing performed by the second network device in the foregoing embodiments. For example, the processor 2101 is configured to change, according to the first objective change packet, the first objective stored in the memory 2102, is further configured to determine whether a first communications link through which the first objective is transmitted between the second network device and the first network device is faulty, and/or is configured to perform another process in the technology described in this specification. For example, the processor 2101 is configured to support the process S107 in FIG. 2. The memory 2102 includes an operating system 21021 and an application program 21022, and is configured to store a program, code, or an instruction. When executing the program, code, or instruction, the processor or a hardware device may complete a processing process of the second network device in the foregoing method embodiments. Optionally, the memory 2102 may include a read-only memory (ROM) and a random access memory (RAM). The ROM includes a basic input/output system (BIOS) or an embedded system, and the RAM includes an application program and an operating system. When the second network device 2100 needs to run, a bootloader in the BIOS or the embedded system that is integrated into the ROM is used to boot a system to start, and boot the second network device 2100 to enter a normal running state. After entering the normal running state, the second network device 2100 runs the application program and the operating system in the RAM, to complete the processing processes performed by the second network device in the method embodiments.

It may be understood that FIG. 11 merely shows a simplified design of the second network device 2100. In actual application, the second network device may include any quantity of interfaces, processors, or memories.

Figure 12:
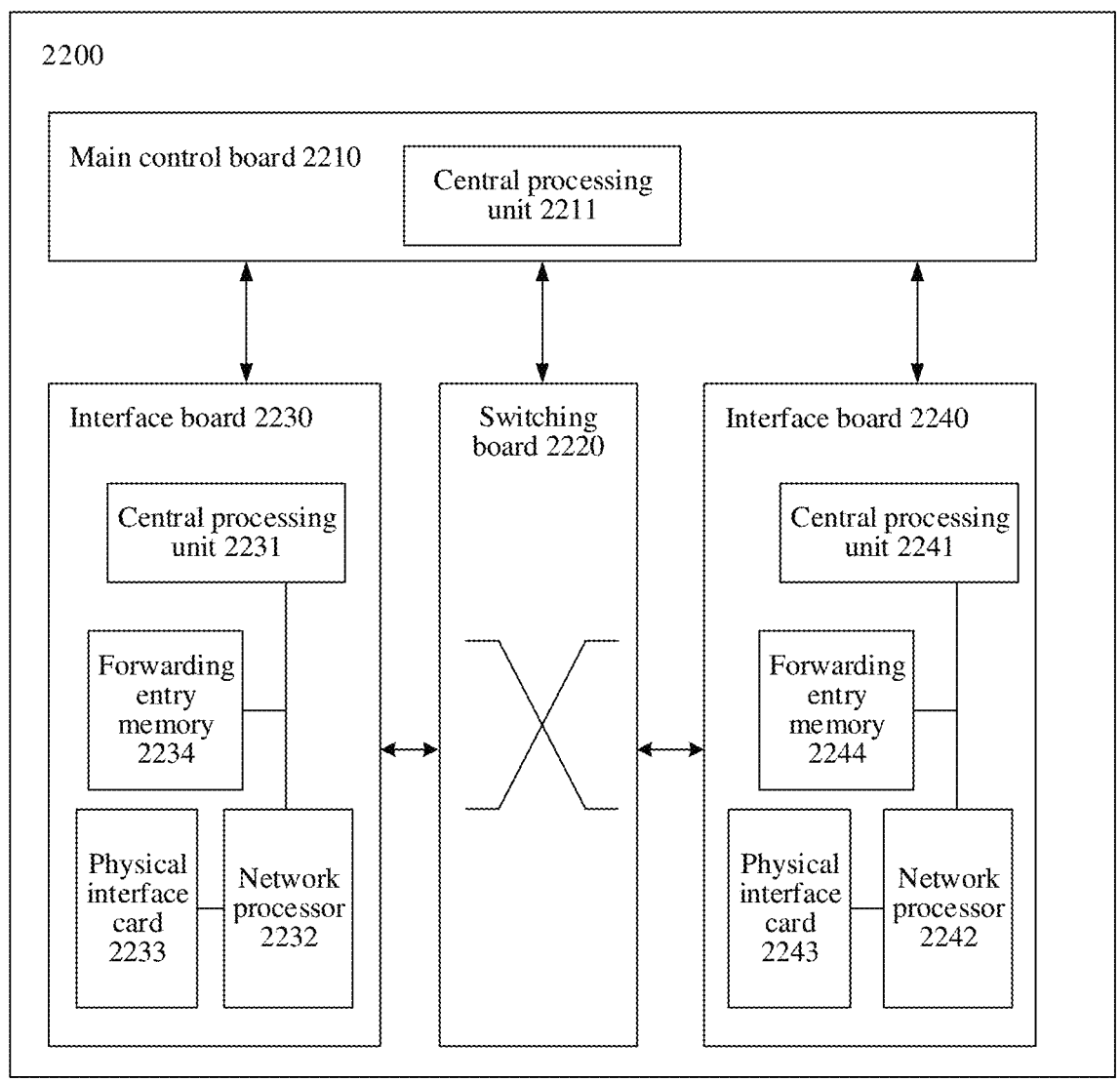
FIG. 12 is a schematic diagram of a hardware structure of another second network device according to an embodiment of this application.

FIG. 12 is a schematic diagram of a hardware structure of another second network device 2200 according to an embodiment of this application. The second network device 2200 shown in FIG. 12 may perform a corresponding step performed by the second network device in the method in the foregoing embodiments.

As shown in FIG. 12, the second network device 2200 includes a main control board 2210, an interface board 2230, a switching board 2220, and an interface board 2240. The main control board 2210, the interface boards 2230 and 2240, and the switching board 2220 are connected to a system backplane through a system bus for interworking. The main control board 2210 is configured to complete functions such as system management, device maintenance, and protocol processing. The switching board 2220 is configured to complete data exchange between interface boards (the interface board is also referred to as a line board or a service board). The interface boards 2230 and 2240 are configured to provide various service interfaces (for example, a POS interface, a GE interface, and an ATM interface), and forward a data packet.

The interface board 2230 may include a central processing unit 2231, a forwarding entry memory 2234, a physical interface card 2233, and a network processor 2232. The central processing unit 2231 is configured to control and manage the interface board, and communicate with a central processing unit on the main control board. The forwarding entry memory 2234 is configured to store a forwarding entry. The physical interface card 2233 is configured to receive and send traffic. The network memory 2232 is configured to control, based on the forwarding entry, the physical interface card 2233 to receive and send the traffic.

The physical interface card 2233 is configured to receive a first objective and a first objective change packet that are sent by the first network device, or send a first objective and a second objective change packet to the third network device.

A central processing unit 2211 is further configured to change, according to the first objective change packet, the first objective stored in the second network device, and is further configured to determine whether a first communications link through which the first objective is transmitted between the second network device and the first network device is faulty. When determining that the first communications link is faulty, the central processing unit 2211 triggers the physical interface card 2233 to send the second objective change packet to the third network device.

The central processing unit 2211 is further configured to generate the second objective change packet. The central processing unit 2211 sends the first objective and the second objective change packet to the physical interface card 2233 by using the central processing unit 2231. The physical interface card 2233 sends the first objective and the second objective change packet to the third network device.

The central processing unit 2231 is further configured to control the network memory 2232 to obtain the forwarding entry in the forwarding entry memory 2234, and the central processing unit 2231 is further configured to control the network memory 2232 to send and receive the traffic by using the physical interface card 2233.

It should be understood that operations of the interface board 2240 are the same as operations of the interface board 2230 in this embodiment of the present invention. For brevity, details are not described again. It should be understood that the second network device 2200 in this embodiment may perform the corresponding functions and/or various steps in the foregoing method embodiments. Details are not described herein again.

In addition, it should be noted that there may be one or more main control boards. When there are a plurality of main control boards, a primary main control board and a secondary main control board may be included. There may be one or more interface boards. A second network device with a stronger data processing capability provides more interface boards. There may also be one or more physical interface cards on the interface board. There may be no switching board or one or more switching boards. When there are a plurality of switching boards, the switching boards may share load and implement redundancy backup. In a centralized forwarding architecture, a second network device may need no switching board, and the interface board implements a service data processing function of an entire system. In a distributed forwarding architecture, a second network device may have at least one switching board, and exchange data between a plurality of interface boards by using the switching board, to provide a large-capacity data exchange and processing capability. Therefore, a data access and processing capability of the second network device in the distributed architecture is better than that of the second network device in the centralized architecture. Which architecture is used depends on a specific networking deployment scenario, and is not limited herein.

In the foregoing embodiment of FIG. 7, FIG. 8, FIG. 9, FIG. 10, FIG. 11, or FIG. 12, optionally, the first objective change packet is a GRASP message, the GRASP message includes a first identifier, and the first identifier is used to indicate that the GRASP message is an objective change packet. Further, optionally, the GRASP message further includes a second identifier, and the second identifier is used to indicate a change type of the first objective that is from the first network device and that is locally stored in the second network device.

In addition, an embodiment of this application provides a computer storage medium, configured to store a computer software instruction used by the foregoing first network device. The computer storage medium includes a program designed for executing the foregoing method embodiment.

In addition, an embodiment of this application provides a computer storage medium, configured to store a computer software instruction used by the foregoing second network device. The computer storage medium includes a program designed for executing the foregoing method embodiment.

An embodiment of this application further includes an ANIMA network system. The ANIMA network system includes a first network device and a second network device. The first network device is the first network device in FIG. 7, FIG. 8, or FIG. 9, the second network device is the second network device in FIG. 10, FIG. 11, or FIG. 12.

The method or algorithm steps described with reference to the content disclosed in this application may be implemented by hardware, or may be implemented by the processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form well-known in the art. For example, a storage medium is coupled to the processor, so that the processor can read information from the storage medium, and write information into the storage medium. Certainly, the storage medium may alternatively be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, the functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    sending, by a first network device, to a second network device, a first objective locally stored in the first network device, wherein an autonomic networking integrated model and approach (ANIMA) protocol is run on both the first network device and the second network device, wherein the first objective is at least one configurable parameter for at least one generic autonomic signaling protocol (GRASP) communications mechanism, and wherein the at least one GRASP communications mechanism is at least one of a GRASP discovery mechanism, a GRASP synchronization mechanism, a GRASP negotiation mechanism, or a GRASP flooding mechanism;
    determining, by the first network device, whether the first objective locally stored in the first network device is changed; and
    sending, by the first network device, a first objective change packet to the second network device in response to the first network device determining that the first objective locally stored in the first network device is changed, the first objective change packet instructing the second network device to change the first objective that is from the first network device and that is locally stored in the second network device, wherein the first objective change packet is a GRASP message, and wherein a changed first objective locally stored in the first network device is the same as a changed first objective locally stored in the second network device.

2. The method according to claim 1, wherein the determining whether the first objective locally stored in the first network device is changed comprises determining, by the first network device, whether the first objective locally stored in the first network device is deleted; and
    wherein the sending the first objective change packet to the second network device comprises sending, by the first network device, in response to the first network device determining that the first objective locally stored by the first network device is deleted, the first objective change packet to the second network device, the first objective change packet instructing the second network device to delete the first objective that is from the first network device and that is locally stored in the second network device.

3. The method according to claim 1, wherein the determining whether the first objective that is locally stored by the first network device is changed comprises determining, by the first network device, whether the first objective that is locally stored by the first network device is modified; and
    wherein the sending the first objective change packet to the second network device comprises, sending, by the first network device, in response to the first network device determining that the first objective locally stored by the first network device is modified, the first objective change packet to the second network device, the objective change packet instructing the second network device to modify the first objective that is from the first network device and that is locally stored in the second network device.

4. The method according to claim 1, further comprising:
    obtaining, by the first network device, an ANIMA disabling message, wherein the ANIMA disabling message instructs the first network device to disable an ANIMA function of a first port, and wherein the first port is a port through which the first network device sends the first objective to the second network device; and
    sending, by the first network device, before the first network device disables the ANIMA function of the first port according to the ANIMA disabling message, a second objective change packet to the second network device, the second objective change packet instructing the second network device to delete, according to the second objective change packet, the first objective that is from the first network device and that is locally stored in the second network device.

5. The method according to claim 1, wherein the GRASP message comprises a first identifier, and the first identifier is used to indicate that the GRASP message is an objective change packet.

6. The method according to claim 5, wherein the GRASP message further comprises a second identifier, the second identifier indicating a change type of the first objective that is from the first network device and that is locally stored in the second network device.

7. The method according to claim 1, wherein the first objective change packet comprises a loop count field indicating a hop quantity for forwarding the first objective change packet as the GRASP message.

8. A first network device, comprising:
    a transmitter;
    a processor coupled to the transmitter; and
    a non-transitory computer-readable storage medium storing a program to be executed by the processor, the program including instructions to:
        cause the transmitter to send a first objective locally stored in the first network device to a second network device, wherein an autonomic networking integrated model and approach (ANIMA) protocol is run on both the first network device and the second network device, wherein the first objective is at least one configurable parameter for at least one generic autonomic signaling protocol (GRASP) communications mechanism, and wherein the at least one GRASP communications mechanism is at least one of a GRASP discovery mechanism, a GRASP synchronization mechanism, a GRASP negotiation mechanism, or a GRASP flooding mechanism;

determine whether the first objective locally stored in the first network device is changed; wherein and cause the transmitter to send a first objective change packet to the second network device in response to determining that the first objective locally stored in the first network device is changed, the first objective change packet instructing the second network device to change the first objective that is from the first network device and that is locally stored in the second network device, wherein the first objective change packet is a GRASP message, and wherein the changed first objective locally stored in the first network device is the same as the changed first objective locally stored in the second network device.

9. The first network device according to claim 8, wherein the instructions to determine whether the first objective locally stored in the first network device is changed include instructions to:

determine whether the locally stored first objective is deleted; and wherein the instructions to cause the transmitter to send the first objective change packet to the second network device include instructions to:

cause the transmitter to send the first objective change packet to the second network device in response to the processor determining that the locally stored first objective is deleted, the first objective change packet instructing the second network device to delete the first objective that is from the first network device and that is locally stored in the second network device.

10. The first network device according to claim 8, wherein the instructions to determine whether the first objective locally stored in the first network device is changed include instructions to:

determine whether the first objective locally stored in the first network device is modified; and wherein the instructions to cause the transmitter to send the first objective change packet to the second network device include instructions to:

cause the transmitter to send the first objective change packet to the second network device in response to determining that the locally stored first objective is modified, the first objective change packet to instructing the second network device to modify the first objective that is from the first network device and that is locally stored in the second network device.

11. The first network device according to claim 8, wherein the program further includes instructions to:

obtain an ANIMA disabling message, and disable an ANIMA function of a first port in response to the ANIMA disabling message, wherein the first port is a port through which the transmitter sends the first objective locally stored in the first network device to the second network device; and cause the transmitter to send a second objective change packet to the second network device before the ANIMA function of the first port is disabled according to the ANIMA disabling message, and delete, in response to receiving the second objective change packet, according to the second objective change packet, the first objective that is from the first network device and that is locally stored in the second network device.

12. The first network device according to claim 8, wherein the GRASP message comprises a first identifier, and wherein the first identifier indicates that the GRASP message is an objective change packet.

13. The first network device according to claim 12, wherein the GRASP message further comprises a second identifier, and wherein the second identifier indicates a change type of the first objective that is from the first network device and that is locally stored in the second network device.

14. A second network device, comprising:

a receiver;

a memory;

a processor; and a non-transitory computer-readable storage medium storing a program to be executed by the processor, the program including instructions to:

receive, through the receiver, a first objective sent by a first network device, wherein an autonomic networking integrated model and approach (ANIMA) protocol is run on both the first network device and the second network device, wherein the first objective is at least one configurable parameter for at least one generic autonomic signaling protocol (GRASP) communications mechanism, and wherein the at least one GRASP communications mechanism is at least one of a GRASP discovery mechanism, a GRASP synchronization mechanism, a GRASP negotiation mechanism, or a GRASP flooding mechanism;

store the first objective in the memory;

receive, through the receiver, a first objective change packet sent by the first network device, wherein the first objective change packet is a GRASP message, and wherein the first objective change packet indicates a change to the first objective locally stored in the first network device; and change, according to the first objective change packet, the first objective stored in the memory, wherein the changed first objective locally stored in the first network device is the same as the changed first objective in the memory of the second network device.

15. The second network device according to claim 14, wherein the instructions to change the first objective stored in the memory include instructions to delete, according to the first objective change packet, the first objective stored in the memory.

16. The second network device according to claim 14, wherein the instructions to change first objective stored in the memory include instructions to modify, according to the first objective change packet, the first objective stored in the memory.

17. The second network device according to claim 14, wherein the GRASP message comprises a first identifier, and wherein the first identifier indicates that the GRASP message is an objective change packet.

* * * * *